United States Patent [19]

Buckner

[11] 4,096,954

[45] Jun. 27, 1978

[54] GONDOLA CAR LOADER

[75] Inventor: Walter E. Buckner, Hartselle, Ala.

[73] Assignee: Lucky Manufacturing Company, Huntsville, Ala.

[21] Appl. No.: 789,887

[22] Filed: Apr. 22, 1977

[51] Int. Cl.[2] .......... B65G 67/00

[52] U.S. Cl. .......... 214/38 CC; 104/137; 214/152

[58] Field of Search .......... 214/38 CA, 38 C, 38 CC, 214/40, 41, 57, 44 R, 44 A; 180/9.32, 9.34, 22, 8 C, 15, 16, 24.02; 104/137; 105/75, 184, 26.1, 7

[56] References Cited

U.S. PATENT DOCUMENTS

| | | | |
|---|---|---|---|
| 1,918,419 | 7/1933 | Needham | 214/38 CA |
| 2,406,546 | 8/1946 | Kinney et al. | 214/44 A |

FOREIGN PATENT DOCUMENTS

| | | | |
|---|---|---|---|
| 677,644 | 1/1964 | Canada | 414/339 |
| 252,815 | 10/1912 | Germany | 180/9.32 |

*Primary Examiner*—Albert J. Makay

*Attorney, Agent, or Firm*—Burns, Doane, Swecker & Mathis

[57] ABSTRACT

A gondola car loader includes a chassis moveable along the top edges of adjacent gondola cars in a direction of the railroad track on which the cars are located. Four beams, pivotably mounted at their centers to the chassis, each carry wheels at both ends thereof for supporting the chassis on the cars. The beams are adapted to be pivoted to selectively engage the wheels with the top edges of the sides of the gondola cars, thereby facilitating motion of the chassis across the gaps between adjacent cars.

9 Claims, 4 Drawing Figures

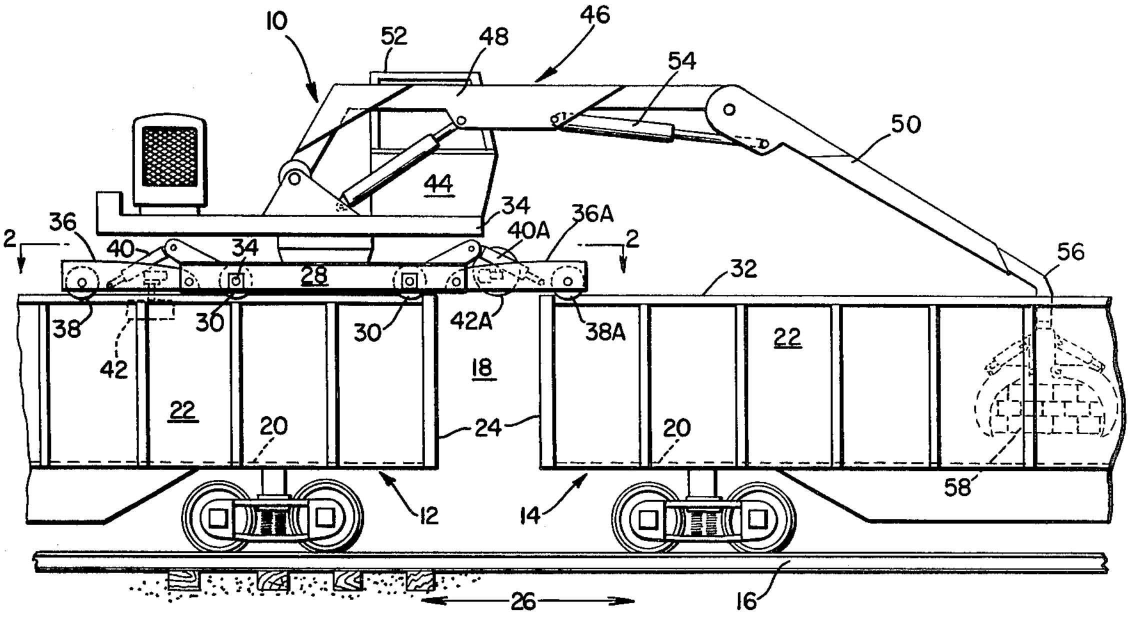
FIG.1 *PRIOR ART*
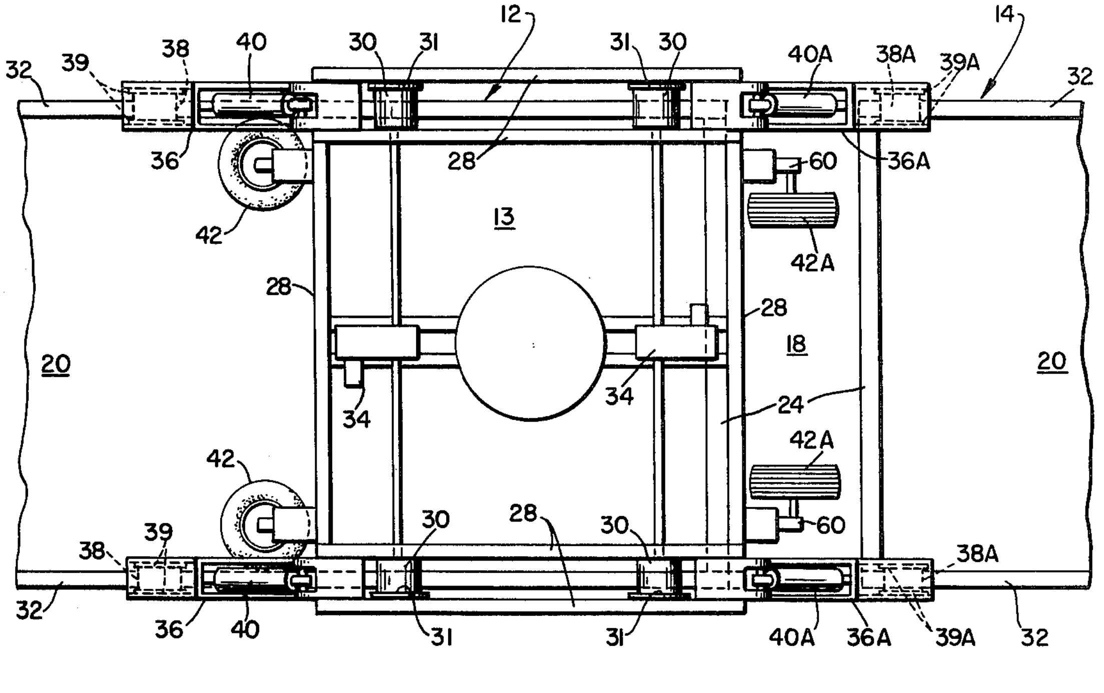
FIG.2 *PRIOR ART*

GONDOLA CAR LOADER

BACKGROUND OF THE INVENTION

Railroad gondola cars are widely used to transport a variety of cargos. Several techniques are known for loading and unloading the cargos.

Gondola cars may be loaded and unloading by hoists, cranes or conveyors which are stationarily mounted with respect to railroad tracks on which the gondola cars run. This arrangement requires that each gondola car be sequentially positioned sufficiently close to the stationary loader to permit the loader to reach the car. Where a coupled line of gondola cars is to be loaded or unloaded, the line of cars may have to be moved, each time one or a few cars have been unloaded in order that the loader may reach additional cars. This requires that a traction engine be periodically operated throughout the loading or unloading of a line of cars.

Accordingly, it is an object of the present invention to provide a gondola car loader which is moveable with respect to a stationary line of gondola cars.

Gondola cars may be loaded and unloaded by mobile loaders which travel along the ground adjacent to a line of gondola cars. This loading technique has a disadvantage in that the mobile loader must be provided with a right of way paralleling railroad tracks on which gondola cars run.

It is another object of the present invention to provide a gondola car loader, moveable with respect to stationary gondola cars, which does not require a right of way adjacent to the railroad track on which the gondola cars are run.

A known method of loading ore cars, illustrated in U.S. Pat. No. 2,906,212 to Hayes, employs specially designed ore cars providing a runway on their top faces on which a loader vehicle may be driven. The loader vehicle is equipped with track laying wheels.

The loader is not, however, adapted for use on conventional gondola cars since the tops of conventional gondola cars do not form nearly continuous runways when the cars are adjacent one another on a railroad track.

Accordingly, it is yet another object of the present invention to provide a loader for conventional gondola cars which is moveable across the tops of adjacent gondola cars without modification of the cars to provide a nearly continuous runway across the tops of the cars.

An apparatus for moving across the tops of adjacent gondola cars is shown in U.S. Patent Application Ser. No. 739,283, filed Nov. 5, 1976, by Thomas E. Leonard and Walter F. Buckner. The apparatus disclosed therein is shown in FIGS. 1 and 2 of this application and is described in detail below. In that apparatus, a loader chassis is provided with pairs of spanning legs at the front and rear of the chassis. Each spanning leg is pivotably mounted at one end thereof, to the chassis. Flanged wheels are rotatably carried by the spanning legs at ends opposite from the ends mounted to the chassis. The wheeled spanning legs are adapted to span gaps between adjacent cars and support the chassis as it is moved across gaps between the gondola cars.

It has been determined that the apparatus of Leonard and Buckner is difficult to fabricate and operate due in part to the configuration and mounting of the spanning legs.

Accordingly, it is yet a further object of the present invention to provide a gondola car loader with easily fabricated and easily operated means for facilitating movement across the gaps between adjacent gondola cars.

These and other objects of the invention will become apparent from the claims and from the following description when read in conjunction with the appended drawings

THE DRAWINGS

FIG. 1 is a side view of a prior art gondola car loader positioned on adjacent gondola cars;

FIG. 2 is a plan cross-sectional view of the gondola car loader of FIG. 1 taken along line 2—2;

DETAILED DESCRIPTION

Figure 3:
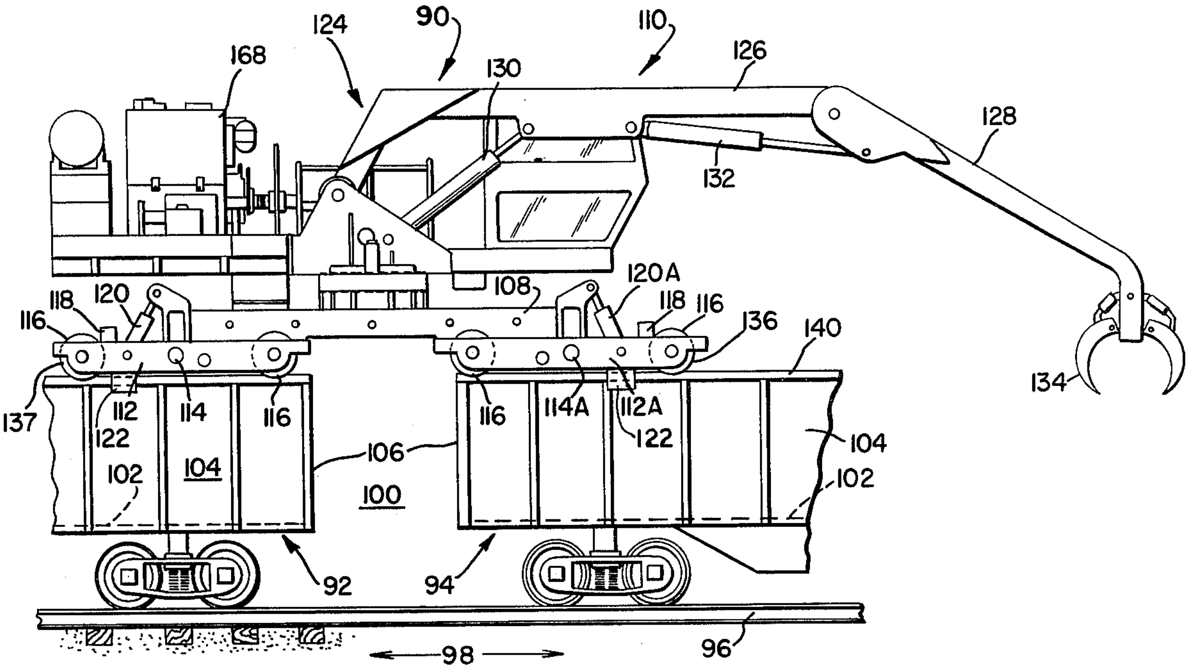
FIG. 3 is a side view of an embodiment of the present invention positioned on adjacent gondola cars.

The Prior Art Shown in FIGS. 1 and 2.

The prior art invention of Leonard and Buckner, disclosed in their patent application Ser. No. 739,283 filed Nov. 5, 1976, relates to a means and method of moving a wheeled apparatus along the upper edges of generally lateral parallel walls of adjacent, gondola cars with gaps therebetween. As shown in FIG. 1, an embodiment of the invention is a gondola car loader including a wheeled chassis moveable along top edges of adjacent gondola cars in a direction of the railroad track on which the cars are located. Spanning legs, pivotably mounted to the chassis, may be adapted to span gaps between adjacent cars and support the chassis as it is moved across the gaps between the cars. A hoist, crane, conveyor, or other suitable loading and unloading means may be carried by the chassis.

With reference to FIG. 1, the prior art gondola car loader 10 is shown positioned on two adjacent conventional gondola cars 12 and 14. The gondola cars 12 and 14 are located on railroad track 16. The cars are separated by a gap 18 which is at least the length of the coupling mechanism of the cars. The bodies of cars 12 and 14 include cargo beds 20, surrounded on four sides by vertical walls. Vertical side walls 22 of the cars are generally parallel to the railroad track 16. Vertical end walls 24 of the cars are generally perpendicular to the forward and reverse directions of motion (arrow 26) of the cars along the railroad track 16.

The prior art gondola car loader includes a chassis 28, carrying wheels 30. The wheels 30 are shown engaging an upper edge portion 32 of the vertical side walls 22 of the gondola car 12. The wheels 30 may be flanged to facilitate guiding the loader in the directions of arrows 26. Motors 34 may be provided to drive wheels 30 to propel the loader across the tops of the gondola cars. Alternatively, a single motor may be employed to drive the wheels 30 and to power hydraulic mechanisms associated with the loader.

Spanning legs 36 and 36A may be pivotably mounted to the chassis 28 at opposite ends thereof. The spanning legs 36 and 36A may carry flanged wheels 36 and 38A, respectively, which wheels are adapted to engage upper edge portions 32 of the side walls 22 of the gondola cars. In one configuration, the wheels 38 and 38A may be flanged at both axial ends thereof to facilitate guiding the loader in the directions of arrow 26. Hydraulic cylinders 40 and 40A, operatively connected to the spanning legs 36 and 36A, respectively, may be provided to selectively pivot the spanning legs to bridge gaps such as gap 18 between adjacent cars. The spanning legs 36 and 36A and their associated wheels 38 and 38A may be operative to guide and support the chassis 28 as it is driven across the gaps between adjacent cars. Rotatable tires 42 and 42A, pivotably mounted to the chassis 28, may be provided to selectively engage the inner sides of walls 22 of the cars to guide the loader and inhibit movement of the loader in a horizontal direction perpendicular to the railroad track 16. Means 44 for engaging and moving cargo may be rotatably mounted on the chassis 28. This means may be a knuckle boom loader 46 as shown in FIG. 1. The knuckle boom loader may include pivotably engaged arms 48 and 50, selectively positionable by means of hydraulic cylinders 52 and 54. Hydraulically actuated grasping means 56 may be provided at the end of knuckle boom 46 for selectively engaging cargo 58.

In operation, the loader 10 may be positioned entirely atop a single gondola car and employed to load and unload cargo within the reach of the knuckle boom 46. When it becomes necessary to move the loader 10 to a new position so that boom 46 may reach or move cargo, the loader may be driven along the tops of the gondola cars and across the gaps therebetween. This movement of the loader 10 may be accomplished in the following way. The loader may be driven in a direction parallel to the railroad track 16 along the tops of the gondola cars, which direction, for purposes of this discussion, will be assumed to be toward the right with respect to FIG. 1. When the wheel 38A of the right spanning leg 36A reaches the vertical wall 24 of the gondola car 12, which is perpendicular to the direction of motion of the loader, the hydraulic cylinder 40A may be actuated to pivot the spanning leg 36A to disengage wheel 38A from the car 12. The right guide tire 42A may be pivoted upward into the chassis to prevent the tire from contacting the wall 24 of the car. The loader may be driven a suitable further distance until the wheel 38A has crossed the gap between the cars and is located over the next adjacent car. Subsequently, the spanning leg 36A may be lowered and guided as necessary to engage wheel 38A with the upper edge portion 32 of the gondola car 14. The spanning leg 36A may be rotated clockwise to support an end of the loader on the car 14 so that the chassis 28 may be driven across the gap 18.

Referring now to FIG. 2, a cross-sectional plan view of the prior art gondola car loader is shown taken along line 2—2 of FIG. 1. In FIG. 2, like structures are identified by the numerals used in FIG. 1.

Figure 4:
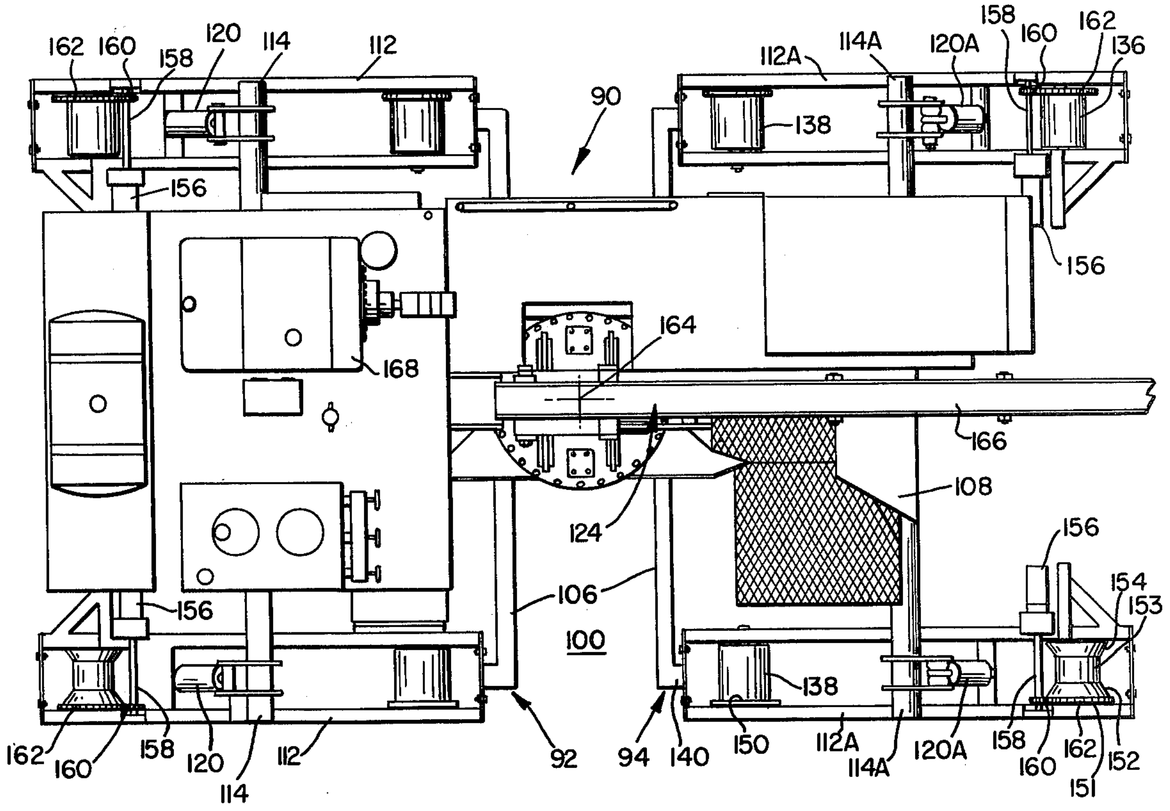
FIG. 4 is a plan cross-sectional view of the embodiment of FIG. 3.

The Embodiment of the Present Invention Shown in FIGS. 3 and 4

An embodiment of the present invention, shown in FIG. 3, comprises an apparatus for loading and unloading gondola railroad cars positioned adjacent one another on a railroad track. The loader may include a chassis movable along the top edges of adjacent gondola cars in the direction of the railroad track on which the cars are located. Four beams, pivotably mounted near their centers to the chassis, may each carry wheels for engaging the top edges of the cars. Advantageously, each beam carries a wheel at both ends thereof. The beams are adapted to be pivoted to selectively engage the wheels with the top edges of immediately adjacent cars to support the chassis, thereby facilitating motion of the chassis across the gaps between adjacent cars. A knuckle boom, for loading and unloading cargo from the cars, may be rotatably mounted on the chassis.

With reference to FIG. 3, a gondola car loader 90 is shown positioned on two adjacent conventional gondola cars 92 and 94. The gondola cars 92 and 94 are movable along a railroad track 96 in either of the directions indicated by a double headed arrow 98. The cars are separated by a gap 100 which is typically the length of the coupling mechanisms of the cars. The bodies of the cars 92 and 94 include cargo beds 102. The cargo beds are surrounded on four sides by vertical walls. Vertical side walls 104 of the cars are generally parallel to the railroad tracks 96. Vertical end walls 106 of the cars are generally perpendicular to the vertical side walls 104.

The gondola car loader may include a chassis 108 on which is mounted a hoist, crane, conveyor, or other suitable loading and unloading device such as a knuckle boom 110.

Elongated members or beams 112 and 112A may be pivotably mounted to the chassis at the centers thereof for rotation about axes 114 and 114A, perpendicular to the plane of the figure. Wheels 116 may be rotatably mounted at either end of the beams 112 and 112A. The wheels 116 may be flanged to facilitate guiding the loader along the edges of the lateral walls of the cars in the directions of the arrow 98. Hydraulic or electrical motors 118 may be provided to drive the wheel 116 to propel the loader across the tops of the gondola cars. Advantageously, only forwardmost wheels 136 and rearwardmost wheels 137 may be driven. (In connection with the description of FIGS. 3 and 4 the convention will be adopted that the word "forward" means rightward with respect to the Figures; it being understood, however, that the apparatus is capable of movement in either the forward or rearward direction and that the apparatus may have no front or rear, in that it may have no preferred direction of movement.) Alternatively, a single motor may be employed to drive the wheels 116 and to power hydraulic mechanisms associated with the loader.

Advantageously, four beams may be pivotably mounted to the chassis 108, two beams mounted on a forward portion of the chassis (beams 112A) and two beams mounted on a rearward portion of the chassis (beams 112). Hydraulic cylinders 120 and 120A, may be operatively connected to the beams to facilitate movement of the loader across the gaps between the gondola cars. The beams 112 and 112A may be provided with downwardly depending members 122 which may engage the outer sides of the walls 104 of the cars to guide the loader and inhibit movement of the loader in a horizontal direction perpendicular to the railroad track 96. An apparatus 124, for engaging and moving cargo, very be rotatably mounted on chassis 108. The apparatus 124 may be a knuckle boom loader having pivotably engaged arms 126 and 128, selectively positionable by means of hydraulic cylinders 130 and 132. Hydraulically actuated grasping means 134 may be provided at the end of the knuckle boom for selectively engaging a cargo within the gondola cars or adjacent thereto.

In operation, the loader 90 may be positioned entirely atop a single gondola car and employed to load and unload cargo within the reach of the knuckle boom. When it becomes necessary to move the loader, for example to reach cargo beyond the range of the knuckle boom, the loader may be driven along the tops of the gondola cars and across the gaps therebetween. This movement of the loader 90 may be accomplished in the following way. The loader may be driven in a direction parallel to the railroad track 96 along the tops of the gondola cars, which direction, for the purposes of this discussion, will be assumed to be in the forward direction. When the forwardmost wheels 136 of the beam 112A reach the vertical wall 106 of the gondola car 92, the hydraulic cylinder 120A may be actuated to pivot the forward beams 112A counterclockwise to raise the wheels 136, thereby disengaging the wheels from the car 92. The counterclockwise pivoting of the beams 112A with respect to the chassis 108 necessarily causes downward motion of the rear wheel 138 of the forward beams 112A, whereby the forward end of the chassis is raised upward and supported by the wheels 138. The loader may be driven a suitable further distance until the forwardmost wheels 136 have crossed the gap 100 between the cars and are located over the next adjacent car 94. Subsequently, the beams 112A may be pivoted in a clockwise direction so that the forward wheels 136 are lowered sufficiently to engage the upper edge portion 140 of the gondola car 94. The beam 112A may be further rotated in a clockwise direction so that the rear wheels 138 of the forward beams 112A are moved upwardly to disengage the car 92. The loader may then be driven a suitable further distance forward until the rear wheels 138 of the forward beams may be lowered onto the car by counterclockwise rotation of the beams 112A. The rear beams 112 may be pivoted in a similar fashion so that the loader 90 may be moved further forward until it is supported entirely on the car 94.

FIG. 4 is a plan view of the gondola car loader 90 shown in FIG. 3 wherein like structures are identified by the numerals used in FIG. 3. The chassis 108 may be supported on upper edge portions 140 of the gondola cars by means of the wheel carrying beams 112 and 112A.

The wheels carried by the beams 112 and 112A may be provided with flanges at their outer axial ends, such as the flanges 150. At least one of the forwardmost or rearwardmost wheels, such as right forward wheel 151, may be provided with frustoconical shaped flanges 152 and 154 at both axial ends thereof separated by cylindrical portion 153. Wheel 151 is thus adapted to center itself on the upper edge portions 140 of the cars, and guide the loader along said edge portions.

The forwardmost and rearwardmost wheels may be driven by motors 156. The motors 156 may be coupled to the wheels by rotatable drive shafts 158 and pinion gears 160 which engage drive gears 162 attached to the forwardmost and rearwardmost wheels. Advantageously, the drive gears 162 may form a portion of the flange at the outer axial ends of the forwardmost and rearwardmost wheels.

In FIG. 4, the wheels carried by the rear beams 112 are shown engaging the upper portions of car 92, while the wheels carried by the forward beams 112A engage the upper edge portions of the car 94. In this configuration, the loader 90 bridges the gap 100 between the cars 92 and 94.

The apparatus for engaging and moving cargo 124 may be mounted on the chassis 108 for rotation about axis 164, perpendicular to the plane of the Figure. The device for engaging and moving cargo may include a knuckle boom 166. The knuckle boom 166 may be dimensioned and located to permit it to reach cargo within the gondola car 94, within adjacent gondola cars, and/or on the ground along the railroad right of way. The knuckle boom 124 and the motors 156 may be powered by an internal combustion engine 168 carried by the chassis 108.

The operation of the gondola car loader shown in FIG. 4 will now be described. For the purposes of this discussion, it will be assumed that the loader is initially positioned atop the car 92, and that all of the loader wheels are initially contacting the upper edges of the car 92. Forward movement of the loader across the tops of gondola cars is effected by actuating at least one of the motors 158 to rotate the wheel to which it is operatively connected, thereby driving the loader along the top of the car 92. When the forward wheels 136 of the loader reach the vertical end wall 106 of the car 92, the beams 112A may be pivoted counterclockwise so that the forward wheel flanges will clear the end wall 106 as the loader is moved further forward. The counterclockwise motion of the beams 112A also results in the loader being at least partially supported by the rear wheels 138 of the forward beam, to the exclusion of the forward wheels 136. The loader is then driven forward and the forward beams 112A are rotated clockwise so that the forward wheels are positioned on the top edge portions of the vertical sidewalls of the gondola car 94. The loader is then at least partially supported on gondola car 94, and the loader may be driven across the gap a suitable distance so that only the wheels of the beams 112 remain in contact with the gondola car 92. The rear beams 112 may be rotated in a similar manner and the loader driven further forward until the loader is supported entirely on the car 94.

The principles, preferred embodiments, and modes of operation of the present invention have been described in the foregoing specification. The invention which is intended to be protected is not, however, to be construed as limited to the particular forms disclosed since these are to be regarded as illustrative rather than restrictive. Variations and changes may be made by those skilled in the art without departing from the spirit and scope of the present invention.

What is claimed is:

1. A method for moving a wheeled vehicle along upper portions of lateral walls of adjacent, open-topped cars and over gaps between adjacent cars comprising the steps of:

(a) positioning the vehicle with the wheels thereof supporting the vehicle on the lateral walls of a first car;
(b) moving the vehicle along the lateral walls of the first car;
(c) pivoting a first member carrying a plurality of vehicle wheels including a first leading wheel about an axis intermediate the leading wheel and another of the wheels, so that the leading wheel disengages the first car;
(d) moving the vehicle until the leading wheel is positioned over a lateral wall of a second car;
(e) pivoting the first member so that the leading wheel engages the lateral wall of the second car and the vehicle is at least partially supported on the second car;
(f) moving the vehicle across the gap between the first and second cars;
(g) pivoting a second member carrying a plurality of vehicle wheels including a second leading wheel about an axis intermediate the second leading wheel and another of the wheels, so that the second leading wheel disengages the first car;

(h) moving the vehicle until the second leading wheel is positioned over a lateral wall of the second car;

(i) pivoting the second member so that the second leading wheel engages the lateral wall of the second car and the vehicle is supported on the second car; and (j) moving the vehicle until the vehicle is positioned on the lateral walls of the second car.

2. A method for moving a wheeled vehicle including a chassis along upper portions of lateral walls of adjacent, open-topped cars and over gaps between adjacent cars comprising the steps of:

(a) positioning the vehicle with the wheels thereof supporting the chassis on the lateral walls of a first car;

(b) moving the vehicle along the lateral walls of the first car;

(c) pivoting a first member carrying a first leading wheel and a first trailing wheel about an axis generally parallel to the axes of rotation of the first leading and trailing wheels and intermediate the first leading and trailing wheels, so that the first trailing wheel moves downward with respect to the chassis and the leading wheel disengages the first car;

(d) moving the vehicle until the first leading wheel is positioned over a lateral wall of a second car;

(e) pivoting the first member so that the first leading wheel engages the lateral wall of the second car and the first trailing wheel moves upward with respect to the chassis whereby the vehicle is at least partially supported on the second car;

(f) moving the vehicle across the gap between the first and second cars;

(g) pivoting a second member carrying a second leading wheel and a second trailing wheel about an axis generally parallel to the axes of rotation of the second leading and trailing wheels and intermediate the second leading and trailing wheels, so that the second trailing wheel moves downward with respect to the chassis and the second leading wheel disengages the first car;

(h) moving the vehicle until the second leading wheel is positioned over a lateral wall of the second car;

(i) pivoting the second member so that the second leading wheel engages the lateral wall of the second car and the second trailing wheel moves upward with respect to the chassis and disengages the first car whereby the vehicle is supported on the second car; and (j) moving the vehicle until the chassis is positioned over the second car.

3. An apparatus moveable along the length of a plurality of railroad gondola cars positioned end to end comprising:

a chassis; and means for supporting said chassis on upper edges of the walls of the cars and for facilitating movement of the chassis across gaps between immediately adjacent cars, said means comprising:

a first pair of elongated beams mounted to a forward portion of said chassis, each of said first pair of elongated beams carrying a plurality of wheels spaced along the length thereof for engaging the upper edges of the walls of the cars, and each of said beams being selectively pivotable in a substantially vertical plane with respect to the chassis at a point intermediate two of said plurality of wheels about an axis generally perpendicular to the length of the beam; and a second pair of elongated beams mounted to a rearward portion of said chassis, each of said second pair of elongated beams carrying a plurality of wheels spaced along the length thereof for engaging the upper edges of the walls of the cars, and each of said beams being selectively pivotable in a substantially vertical plane with respect to the chassis at a point intermediate two of said plurality of wheels about an axis generally perpendicular to the length of the beams.

4. The apparatus of claim 3 further comprising hydraulic means for independently and selectively pivoting said first pair and said second pair of elongated beams.

5. The apparatus of claim 3 wherein one of said first pair of elongated beams carries a wheel at the forward end thereof said wheel comprising:

a first frustroconical portion, the largest diameter thereof being axially outermost;

a cylindrical portion integral and coaxial with said first frustroconical portion; and a second frustroconical portion integral and coaxial with said cylindrical portion, the largest circumference of said second frustroconical portion being located on a side of the wheel opposite from the largest circumference of said first frustroconical portion; whereby, said wheel is adapted to center itself on edges of lateral walls of the gondola cars to guide the apparatus.

6. The apparatus of claim 3 further comprising means for driving a forward wheel located at a forward end of one of the first pair of elongated beams and for driving a rearward wheel located at a rearward end of at least one of the second pair of elongated beams.

7. The apparatus of claim 6 wherein said means for driving said wheels includes a toothed wheel coaxially mounted to said wheels, the diameter of said toothed wheel being larger than the diameter of the wheel to which the toothed wheel is coaxially mounted.

8. An apparatus moveable along the length of a plurality of open-topped railroad cars positioned end to end comprising:

a chassis; and means for supporting said chassis on upper edges of the walls of the car and for facilitating movement of the chassis across gaps between immediately adjacent cars, said means comprising:

a first pair of elongated beams mounted to a forward portion of said chassis, each of said first pair of elongated beams carrying a first leading wheel and a first trailing wheel spaced along the length thereof for engaging the upper edges of the lateral walls of the cars, and each of said beams being selectively pivotable with respect to the chassis at a point intermediate said first leading and trailing wheels about an axis generally parallel to the axes of rotation of said first leading and trailing wheels, wherein said first leading and trailing wheels are pivotable upwardly and downwardly with respect to the chassis a sufficient amount so that the apparatus is selectively partially supportable on one of the first leading and trailing wheels to the exclusion of the other of said first leading and trailing wheels; and a second pair of elongated beams mounted to a rearward portion of said chassis, each of said second pair of elongated beams carrying a second leading wheel and a second trailing wheel spaced along the length thereof for engaging the upper edges of the lateral walls of the cars, and each of said beams being selectively pivotable with respect to the chassis at a point intermediate said second leading and trailing wheels about an axis generally parallel to the axes of rotation of said second leading and trailing wheels, wherein said second leading and trailing wheels are pivotable upwardly and downwardly with respect to the chassis a sufficient amount so that the apparatus is selectively partially supportable on one of the second leading and trailing wheels to the exclusion of the other of said second leading and trailing wheels.

9. In an apparatus, moveable along upper edges of lateral walls of adjacent gondola cars and over gaps therebetween, including a wheeled means for supporting said chassis on upper edges of the walls of the cars and for facilitating movement of the chassis across gaps between immediately adjacent cars, the improvement wherein said supporting means comprises:

a first, forward elongated beam mounted to a forward portion of said chassis, said elongated beam carrying a plurality of wheels spaced along the length thereof for engaging the upper edges of the walls of the cars, and said beam being selectively pivotable in a substantially vertical plane with respect to the chassis at a point intermediate two of said plurality of wheels about an axis generally perpendicular to the length of the beam; and a second, rearward elongated beam mounted to a rearward portion of said chassis, said elongated beam carrying a plurality of wheels spaced along the length thereof for engaging the upper edges of the walls of the cars, and said beam being selectively pivotable in a substantially vertical plane with respect to the chassis at a point intermediate two of said plurality of wheels about an axis generally perpendicular to the length of the beam.

* * * * *